United States Patent
Nelson et al.

(10) Patent No.: US 10,771,514 B2
(45) Date of Patent: Sep. 8, 2020

(54) SYSTEMS AND METHODS FOR FACILITATING THE SHARING OF USER-GENERATED CONTENT OF A VIRTUAL SPACE

(71) Applicant: Disney Enterprises, Inc., Burbank, CA (US)

(72) Inventors: Robert Nelson, Salt Lake City, UT (US); James Rowe, Herriman, UT (US); Jose Villeta, Playa Vista, CA (US)

(73) Assignee: Disney Enterprises, Inc., Burbank, CA (US)

(*) Notice: Subject to any disclaimer, the term of this patent is extended or adjusted under 35 U.S.C. 154(b) by 1091 days.

(21) Appl. No.: 14/940,015

(22) Filed: Nov. 12, 2015

(65) Prior Publication Data

US 2017/0142168 A1 May 18, 2017

(51) Int. Cl.
*H04L 29/06* (2006.01)
*H04L 29/08* (2006.01)
*G06F 16/84* (2019.01)

(52) U.S. Cl.
CPC ............ *H04L 65/403* (2013.01); *G06F 16/84* (2019.01); *H04L 67/2823* (2013.01); *H04L 69/24* (2013.01)

(58) Field of Classification Search
CPC ............ A63F 2300/5533; A63F 13/323; A63F 2300/407; A63F 2300/575; A63F 13/12; A63F 13/30
USPC ......................................................... 709/204
See application file for complete search history.

(56) References Cited

U.S. PATENT DOCUMENTS

| | | | |
|---|---|---|---|
| 6,477,580 B1 | 11/2002 | Bowman-Amuah | |
| 2003/0130021 A1 | 7/2003 | Lydon | |
| 2006/0148545 A1 | 7/2006 | Rhyne | |
| 2006/0258447 A1* | 11/2006 | Baszucki | A63F 13/12 463/31 |
| 2008/0141011 A1* | 6/2008 | Zhang | G06F 9/45516 712/226 |
| 2009/0063463 A1 | 3/2009 | Turner | |
| 2010/0017728 A1 | 1/2010 | Cho | |
| 2010/0064275 A1* | 3/2010 | Akkiraju | G06F 8/34 717/104 |

(Continued)

FOREIGN PATENT DOCUMENTS

| | | |
|---|---|---|
| CN | 102855209 | 1/2013 |
| EP | 1333376 | 8/2003 |
| WO | 2013086663 A1 | 6/2013 |

OTHER PUBLICATIONS

"On the Link Between Mobile App Quality and User Reviews". Hammad Khalid. Queen's University. (Year: 2014).*

(Continued)

*Primary Examiner* — Tonia L Dollinger
*Assistant Examiner* — Jonathan A Sparks
(74) *Attorney, Agent, or Firm* — Esplin & Associates, PC (57) ABSTRACT

Systems and methods for facilitating the sharing of user-generated content of a virtual space are presented herein. The user-generated content may be shared between users of different computing platforms. The computing platforms may be of different platform types. The user-generated content may be shared through platform type-specific conversions of the information that defines the user-generated content. The processing cost and/or other cost information may be determined and/or estimated.

18 Claims, 3 Drawing Sheets

(56) References Cited

U.S. PATENT DOCUMENTS

| | | |
|---|---|---|
| 2011/0131226 A1 | 6/2011 | Chandra |
| 2011/0136577 A1* | 6/2011 | Dietz .................... A63F 13/332 463/43 |
| 2011/0231781 A1* | 9/2011 | Betzler ............... G06F 12/0875 715/757 |
| 2011/0307304 A1 | 12/2011 | Mercuri |
| 2012/0122587 A1 | 5/2012 | Kelly |
| 2012/0260195 A1 | 10/2012 | Hon |
| 2012/0309511 A1 | 12/2012 | Chung |
| 2013/0132477 A1 | 5/2013 | Bosworth |
| 2013/0159998 A1* | 6/2013 | Cawlfield ........... G06F 9/45558 718/1 |
| 2013/0346453 A1 | 12/2013 | Procopio |
| 2014/0108103 A1* | 4/2014 | Romaine ......... G06Q 10/06395 705/7.41 |
| 2014/0162781 A1 | 6/2014 | Butler |
| 2014/0315639 A1 | 10/2014 | Cao |
| 2015/0052458 A1 | 2/2015 | Rothenberger |
| 2016/0162478 A1* | 6/2016 | Blassin ............ G06Q 10/06311 706/12 |
| 2016/0250558 A1 | 9/2016 | Fujisawa |
| 2016/0279522 A1 | 9/2016 | De Plater |
| 2016/0332081 A1 | 11/2016 | Marr |
| 2016/0346688 A1* | 12/2016 | Wakeford ............... A63F 13/00 |
| 2017/0120150 A1 | 5/2017 | Berger |

OTHER PUBLICATIONS

Razia Sultana, Andreas Christ, Patrick Meyrueis, "Diversity of devices along with diversity of data formats as a new challenge in global teaching and learning system," Proc. SPIE 9289, 12th Education and Training in Optics and Photonics Conference, 92891V (Jul. 17, 2014); doi: 10.1117/12.2070563 Event: 12th Education and Training in Optics and Photonics Conference, 2013, Porto, Portugal, 7 pages.

Anonymous, Mobile Web Best Practices 1.0—Jun. 27, 2006 (Jun. 27, 2006); pp. 1-35.

* cited by examiner

SYSTEMS AND METHODS FOR FACILITATING THE SHARING OF USER-GENERATED CONTENT OF A VIRTUAL SPACE

FIELD OF THE DISCLOSURE

This disclosure relates to systems and methods for sharing user-generated content of a virtual space, and, more particularly, for determining processing costs for implementing the user-generated content on computing platforms of different platform types.

BACKGROUND

Computing platforms, such as those configured to access virtual spaces, may differ in that they operate on different platform types. For example, computing platforms employed for gaming may operate on different gaming platform types. Gaming platform types may include, for example, XBOX, PLAYSTATION, Wii, PC, MAC, iOS mobile devices, Android devices, tablets, mobile devices, browser-based gaming platforms, set top micro-consoles platforms, streaming gaming platforms, and other platform types. Corresponding computing platforms may include, for example, XBOX 360 of the XBOX computing platform type, XBOX ONE of the XBOX computing platform type, PLAYSTATION 3 of the PLAYSTATION computing platform type, PLAYSTATION 4 of the PLAYSTATION computing platform type, Wii U of the Wii computing platform type, a smart TV of the browser-based computing platform type, APPLE TV of the set-top micro console type, and/or other user devices configured to access virtual spaces.

When virtual space content is shared between computing platforms of different platform types, there may be an unknown processing cost for implementing the sharable content from one platform type to another. For example, user-generated content may be created by a user on a PLAYSTATION and converted for sharing with another user on an XBOX, and/or other platform. The user-generated content may require a certain amount of processing power and/or functionality on the PLAYSTATION, while the converted user-generated content may require a different and/or unknown amount of processing power and/or functionality on the XBOX, and/or other platform.

SUMMARY

One or more aspects of the disclosure relate to a system for facilitating the sharing of user-generated content of a virtual space. The user-generated content may be shared between users of source computing platforms and users of end computing platforms. The sharing of user-generated content between users may be facilitated through platform type-specific format conversions of the information that defines the user-generated content. The users may upload information that defines the user-generated content to a host server for sharing. Other users may download the information and/or converted versions of the information at the end computing platform via the host server.

In some implementations, the processing costs to execute the converted versions of the information at the end computing platforms may differ from the processing costs at the source computing platforms. Causes of such differences in processing costs may be the conversion of the information and/or attributes of the conversion, the difference in platform type between the source and end computing platforms, the characteristics of the user-generated content defined by the information itself, and/or other cost factors. It may be desirable to inform users of these processing costs or potential processing costs associated with execution of the converted information the end computing platforms. This way, a user may have some expectation of whether or not a particular end computing platform may be capable, at least in some degree, of executing the converted versions of the information. The degree of execution may affect whether one or more characteristics, features, and/or functions of the user-generated content may be playable at the end computing platform.

In some implementations, an estimate of cost may be determined. The estimate may be used to determine notifications to present to users at one or both of the source computing platforms or the end computing platforms. The notifications may include messages and/or other information associated with the estimated cost so that the user may be informed of an estimated and/or expected quality of the user-generated content at one or more particular end computing platforms. At least one technique in which cost may be estimated may be provided in more detail herein. Briefly, in some implementations, estimated costs may be determined based on historical costs associated with past conversions and subsequent executions of information that defines user-generated content.

The system may include one or more processors configured to execute one or more computer program components. The computer program components may include one or more of a space component, a user-generated content component, a receiving component, a sharing component, a conversion attribute component, an actual cost component, an impact component, an estimated cost component, a notification component, and/or other components.

The space component may be configured to execute an instance of a virtual space. The space component may be configured to implement the instance of the virtual space to facilitate user participation in the virtual space. Users may participate in the virtual space by providing entry and/or selection of virtual space content. The entry and/or selection of virtual space content may generate, provide, and/or otherwise correspond with requests to define user-generated content within an instance of the virtual space. In some implementations, instances of the virtual space may be hosted by a server to computing platforms associated with the users. In some implementations, the instances of the virtual space may be hosted locally at the computing platforms.

The user-generated content component may be configured to receive entry and/or selection from the users of virtual space content. The entry and/or selection of virtual space content may correspond to requests to define corresponding user-generated content within the virtual space. Entry and/or selection may be facilitated through one or more input mechanisms included with and/or coupled to the computing platforms. The users may be able to provide entry and/or selection for virtual space content that may correspond to requests for selection, placement, and/or arrangement of one or more virtual objects and/or other content within the virtual space.

The receiving component may be configured to receive information that defines user-generated content. The information that defines the user-generated content may include one or more of the platform type of the source computing platform used to generate the content, one or more characteristics associated with the user-generated content, user information, and/or other information. In some implementations, the receiving component may be configured to receive the information in conjunction with the users sharing the user-generated content (e.g., facilitated by the sharing component).

The sharing component may be configured to facilitate the sharing of user-generated content between users. The sharing component may be configured such that facilitating the sharing of user-generated content includes one or more of converting the information that defines the user-generated content to one or more other formats, and/or other operations. In some implementations, the conversions may be platform-type specific conversions that are specific to one or more particular end computing platforms. In some implementations, the sharing component may be configured to receive requests for user uploads of the information that defines user-generated content, effectuate reception of the information (e.g., via receiving component) and/or convert the format of information to one or more other formats for sharing. In some implementations, the sharing component may be configured to receive requests from users to download the information and/or converted information that defines the user-generated content.

The conversion attribute component may be configured to determine conversion attributes associated with the information that defines the user-generated content. The conversion attributes may represent the various format conversion processes, routines, and/or procedures that may take place in order to convert the source information to converted information. The conversion attributes may be determined based on one or more characteristics of the user-generated content, the platform type of the source computing platform, the platform type of the end computing platform, and/or other information.

The actual cost component may be configured to obtain actual cost information associated with executing converted information on the end computing platforms. The actual cost information may be obtained from the end computing platforms. For example, the end computing platform may locally execute usage reports based on the execution of the converted information. The usage report may provide information such as processing power used, whether or not the end computing platform lagged, froze and/or crashed, identification of one or more characteristics of the user-generated content, and/or other information. In some implementations, an actual cost may be obtained for individual ones of the conversion attributes of the information that defines the user-generated content (e.g., a cost per attribute).

The impact component may be configured to determine impacts of the conversion attributes and/or combinations of the conversion attributes based on the obtained actual cost information. The impacts include information that correlates the individual ones of the conversion attributes and/or combinations of conversion attributes with an actual cost, the source computing platform type, the end computing platform type, and/or other information. The impacts may maintain a record of historical costs associated with individual ones of the conversion attributes based on the source computing platform type and the end computing platform type, and/or other information.

The estimated cost component may be configured to determine estimated cost information associated with executing platform type-specific conversions of the information at the end computing platforms. The estimated cost information may include estimated costs for individual ones of the conversion attributes associated with the information. The estimated costs may be determined based on the historical costs associated with the conversion attributes and/or other information.

The notification component may be configured to effectuate presentation of notifications to users. The notifications may include information relating to the estimated cost information. The notifications may include messages and/or other information to inform the users of an estimated and/or expected quality of the user-generated content at an end computing platform.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
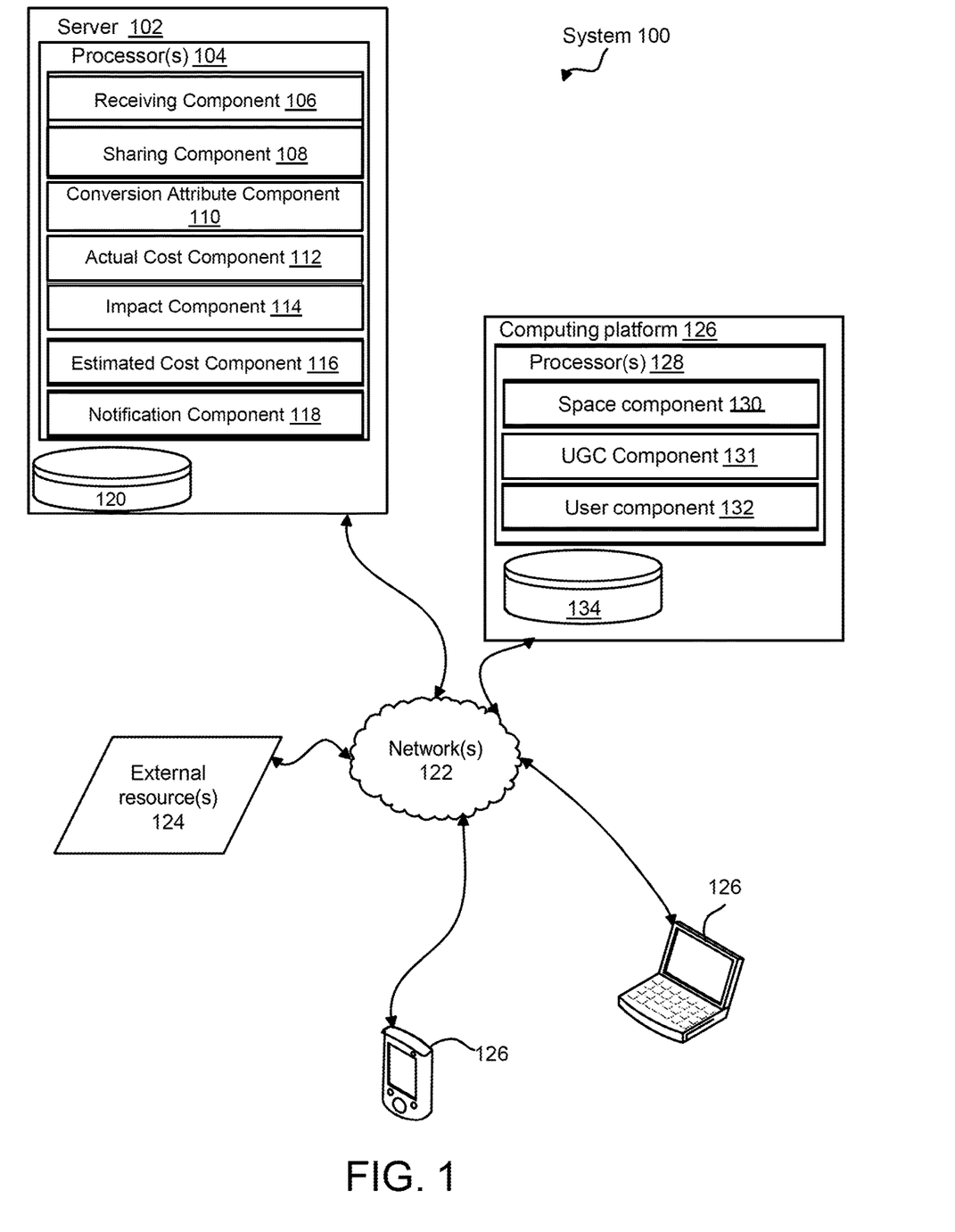
FIG. 1 illustrates an implementation of a system for facilitating the sharing of user-generated content of a virtual space.

FIG. 1 illustrates a system 100 for facilitating the sharing of user-generated content of a virtual space, in accordance with one or more implementations. User-generated content of the virtual space may include content generated by users on source computing platforms that are of a particular platform type. The user-generated content may be shared with other users at end computing platforms that may be of a different platform type than that of the source computing platforms. The format of information (e.g., code) that defines the user-generated content may be specifically converted based on a particular platform type. A cost to execute the converted information that defines the user-generated content on an end computing platform may be different from the cost to execute the source information that defines the user-generated content on the source computing platform. The determination of such cost and/or related information may be used to provide notifications to the users. In some implementations, this cost information may be determined prior to actual conversion of the user-generated content, and/or other at other times. For example, a notification may inform a user of one or more of whether or not a particular platform type may be capable of implementing platform type-specific conversions of information that defines the user-generated content, if one or more aspects of the user-generated content may be degraded and/or missing during implementation, suggestions to improve the quality of the user-generated content on his or her respective platform, and/or other information.

The computing platforms 126 may include, for example, a cellular telephone, a smartphone, a laptop, a tablet computer, a desktop computer, a television set-top box, a smart TV, a gaming console, a client device, and/or other device suitable for the intended purpose(s) presented herein. The computing platforms 126 may be of different platforms types. Platform types may include gaming platform types and/or other platform types. Gaming platform types may include, for example, XBOX, PLAYSTATION, Wii, PC, MAC, iOS mobile devices, Android devices, tablets, mobile devices (e.g., cell phones, smartphones, etc.), browser-based gaming platforms, set top micro-consoles platforms, streaming gaming platforms, and/or other platform types. In some implementations, the computing platforms 126 may include XBOX 360 of the XBOX platform type, XBOX ONE of the XBOX platform type, PLAYSTATION 3 of the PLAYSTATION platform type, PLAYSTATION 4 of the PLAYSTATION platform type, Wii U of the Wii platform type, a smart TV of the browser-based gaming platform type, an APPLE TV of the set-top micro console type, and/or other platforms configured to carry out the various features of the invention described herein. In some implementations, the computing platforms 126 may be devices capable of network communications. In some implementations, the computing platforms 126 may include Internet-connectable devices.

Herein, the term "content" may refer collectively to one or more of virtual objects, game entities, game metrics and/or mechanics, logical relationships established between virtual objects through one or more programming rules, and/or other content. A game entity may refer to a virtual object (or group of objects) present in the virtual space that represents an individual user. A game entity may be a virtual character (e.g., an avatar) and/or other virtual object. A group of game entities may include a group of one or more of virtual characters, virtual objects, and/or other game entities. In some implementations, a group of game entities may comprise one or more of a troop, a battalion, a clan, and/or other group.

Virtual objects may be associated with virtual items and/or goods that may be usable within the virtual space and/or a video game that takes place in the virtual space. Virtual items and/or goods may include one or more of a virtual weapon, a tool, a food, a currency, a reward, a bonus, health, a potion, an enhancement, a mount, a power-up, a speed-up, virtual clothing (e.g., shirt, hat, pants, etc.), a vehicle, an anatomical feature of a character and/or game entity, a troop or troop type, a pet, a virtual resource, a structure element, and/or other virtual items and/or goods.

In FIG. 1, in some implementations, providing the virtual space may include hosting the virtual space on the computing platforms 126. The computing platforms 126 may be configured to execute an instance of the virtual space and/or a video game taking place in the virtual space by using information stored by and/or local to the computing platforms 126 (e.g., a cartridge, disk, a memory card/stick, flash memory, electronic storage, and/or other storage), and/or other information. In some implementations, the computing platforms 126 may be configured to execute an instance of the virtual space and/or video game using information received from a server 102.

The computing platforms 126 may include one or more processors 104 configured to execute one or more computer components for implementing the instance of the virtual space and to facilitate the participation of an associated user(s) in the virtual space. The computer program components of the computing platforms 126 may include one or more of a space component 130, a user-generated content (UGC) component 131, a user component 132, and/or other components. In some implementations, the computing platforms 126 may be configured to communicate with server 102, for example, over network(s) 122 via client/server architecture, and/or other communication scheme.

In some implementations, some or all of the functionality of the computing platforms 126 may be attributed to the server 102. In such implementations, providing the virtual space may include hosting the virtual space over the network (s) 122. The server 102 may include one or more processors 104 configured by machine-readable instructions to execute the one or more computer components for implementing an instance of the virtual space and/or a video game taking place within the virtual space and to facilitate the participation of one or more users in the virtual space and/or the video game (e.g., online game). Processors 104 may include the same or similar components as presented for the computing platforms 126, and/or other components. The users may access server 102 and/or the virtual space via the computing platforms 126. Server 102 may include electronic storage 120.

In some implementations of online gameplay and/or other gameplay, the server 102 may be configured to determine the state of the virtual space. The state may then be communicated (e.g., via streaming visual data, object/position data, and/or other state information) from server 102 to the computing platforms 126 for presentation to the associated user(s) via client/server architecture. In some implementations, server 102 may be attributed with more or less of the functionality described herein for the computing platforms 126 in order for server 102 to execute an instance of the virtual space the same as or similar to that as presented herein.

Referring back to the computing platforms 126, the space component 130 may be configured to execute an instance of the virtual space and to implement the instance of the virtual space on the corresponding computing platform 126. The instance of the virtual space may be executed by the computer components to determine the state of the virtual space. The state determined and presented by a given computing platform 126 may correspond to a location in the virtual space (e.g., location in the game). The view described by the state may correspond, for example, to the location from which the view is taken, the location the view depicts, and/or other locations, a zoom ratio, a dimensionality of objects, a point-of-view, and/or view parameters of the view. One or more of the view parameters may be selectable by the users.

An instance of the virtual space may comprise a simulated space that is accessible by the users via the computing platform 126 that presents the views of the virtual space to the users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

In some implementations, the different computing platforms 126 may execute different instances of the virtual space for implementation on the respective computing platforms. In some implementations, the different instances may be related. In some implementations, the different instances may be unrelated. For example, the different instances executed by different computing platforms 126 may have started from a same or similar state. The users of the respective computing platforms 126 may modify and/or interact with the virtual space differently within the respective executed instances. As such, the space components 130 of the different computing platforms 126 may express the virtual space differently.

By way of non-limiting example, a first instance of the virtual space executed on a first computing platform may comprise a first virtual environment (e.g., a first virtual village) created by a first user. A second instance of the virtual space executed on a second computing platform may comprise a second virtual environment (e.g., a second virtual village) created by a second user. In some implementations, the second virtual environment present within the second instance of the virtual space may not be accessible by the first user during participation in the first virtual environment within the first instance of the virtual space executed by the first computing platform, and/or vice versa. In some implementations, the second virtual environment within the second instance of the virtual space may be accessible by the first user during participation in the first virtual environment within the first instance of the virtual space executed by the first computing platform, and/or vice versa. Instances of the virtual space may be considered in other ways.

The discussion of "virtual village" above is not intended to limit the type of content which may not be common between the first instance and the second instance of the virtual space. Instead, this is simply an example, and is not limiting with respect to content type, theme, and/or other characteristics.

The above description of the manner in which the state of the virtual space is determined by space component 130 is not intended to be limiting. The space component 130 may be configured to express the virtual space in a more limited, or rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 130, users may control game entities, groups of game entities, simulated physical phenomena (e.g., wind, rain, earthquakes, and/or other phenomena), and/or other elements within the virtual space to interact with the virtual space and/or other users. The game entities may include virtual characters such as one or more of avatars, group entities, and/or other virtual characters. A given game entity and/or group of game entities may be controlled by a user with which it is associated. The user-controlled element(s) may move through and interact with the virtual space (e.g., non-user characters in the virtual space and/or other objects in the virtual space). The user-controlled elements controlled by and/or associated with a user may be created and/or customized by the user, based on information received by the given computing platform 126 (e.g., from server 102), and/or may be based on other information. The users may have an "inventory" of virtual items, game entities, and/or currency that the user can use (e.g., by manipulation of a virtual character or other user-controlled element, and/or other items) within the virtual space.

The users may participate in the instance of the virtual space by controlling one or more of the available user-controlled game entities in the virtual space. Control may be exercised through control inputs such as entry, selection, and/or commands input by the users through a given computing platform 126. Users may interact through communications exchanged within the virtual space. Such communications may include one or more of textual chat, instant messages, private messages, voice communications, and/or other communications. Communications may be received and entered by the users via their respective computing platforms 126. Communications may be routed to and from the appropriate users through network(s) 122 and/or through communications which are external to the system 100 (e.g., text messaging services associated with the users).

In some implementations, the users may participate in an instance of the virtual space through entry and/or selection of virtual space content via the computing platforms 126 of virtual space content. The entry and/or selection of virtual space content may generate requests to define the virtual space content (e.g., user-generated content) within the virtual space (see, e.g., user-generated content component 131). For example, the users may provide entry and/or selection of virtual space content corresponding requests to define one or more of customized virtual spaces, portion(s) of a virtual space, and/or other requests. The user-generated content may include, for example, a game, a scene, an environment, one or more virtual objects, and/or other content.

The instance of the virtual space and/or the online game that takes place therein may be persistent. That is, the virtual space and/or the game may continue on whether or not individual players are currently logged in and/or participating in the game. A player who logs out of the virtual space and then logs back in some time later may find the virtual space has been changed through the interactions of other players within the virtual space during the time the player was logged out. These changes may include changes to the simulated physical space, changes in the player's inventory, changes in other player's inventories, user-generated content, changes experienced by non-player characters, changes to the virtual items available for use in the online game, and/or other changes.

In FIG. 1, the user-generated content component 131 may be configured to obtain requests to define corresponding user-generated content within the virtual space. The requests may correspond to entry and/or selection of virtual space content by the users. The entry and/or selection may be facilitated through one or more input mechanisms included and/or coupled to the computing platforms 126 (e.g., a controller, a game controller, a keyboard, a touch-sensitive interface, physical interface elements, virtual interface elements, and/or other mechanisms). In some implementations, receiving entry and/or selection from the user may be facilitated via a user interface effectuated by the user-generated content component 131. User-generated content component 131 may be configured to effectuate presentation of a user interface depicting a "blank" virtual space and/or portion of a virtual space. The virtual space and/or portion thereof may not include virtual objects and/or other content, and/or may include limited virtual objects and/or other content. Users may make selections of additional content to generate requests to customize the virtual space. User selections and/or entry of content to generate the requests for defining content may be facilitated in a variety of ways. For example, the displayed user interface may include drop down menus, drag-and-drop icons, check boxes, and/or other display elements which represent virtual objects and/or other virtual content which are available to be arranged within the virtual space by the user. The users may be able to provide entry and/or selection of content corresponding to requests for selection, placement, and/or arrangement of one or more virtual objects and/or other content within the virtual space.

In some implementations, the user-generated content component 131 may be configured to provide virtual space templates. Virtual space templates may correspond to instances of the virtual space which include some, or few, virtual objects and/or other content arranged in predetermined positions, and/or other predetermined content. The user-generated content component 131 may be configured to allow users to further customize the virtual space templates to create custom virtual spaces (e.g., user-generated content).

The user-generated content may be described by one or more characteristics. The characteristics may include one or more of one or more virtual objects associated with the user-generated content, combinations of virtual objects associated with the user-generated content, logical relationships established between virtual objects, one or more games included in user-generated content, game objects associated with the games, game logic associated with the game, metadata, and/or other characteristics.

In some implementations, user-generated content may be associated with virtual objects which may be arranged and/or displayed within views of the virtual space in accordance with entry and/or selection by the users requesting such arrangement and/or display. Virtual objects may include one or more of structural building elements (e.g., a brick, a stone, a pillar, and/or other elements), combinations of virtual objects that are arranged together to define a larger scale virtual object (e.g., a virtual building made up of virtual building blocks, and/or other objects), vehicles, characters, and/or other elements and/or topographical elements which may be capable of interaction with the users of the virtual space. Users may arrange the virtual objects in manner to depict one or more of a virtual environment, a game space or area, a location, a scene, and/or other arrangements. A virtual environment may be one or more of a virtual world, a city, a village, a race track, a maze, an obstacle course, a house, a store, and/or other environment. A virtual environment may include buildings which the users can enter while interacting in the virtual space. A virtual environment may include other virtual objects and/or other content.

In some implementations, a virtual object may comprise a combination, collection, and/or arrangement of elemental virtual objects (e.g., a structural element, a building block, and/or other elemental virtual objects). For example, a virtual object such as a building may comprise a plurality of elemental virtual objects such as bricks (and/or other elemental virtual objects) that are arranged and/or placed in a manner to "create" the building. Herein, it is noted that the term "element", "modular element", "modular component", "modular virtual object", and/or "elemental virtual object" may refer to virtual objects that may be used to create and/or build larger-scale virtual objects in some organized fashion (e.g., a brick may be considered an elemental virtual object, while a building made of brinks may be considered the larger-scale virtual object). Herein, the terms "combination of virtual objects", "structured arrangement", and/or "large-scale virtual object" may refer to the virtual object that may be comprised of the multiple elemental virtual objects.

In some implementations, user-generated content may be associated with logical relationships established between the one or more virtual objects included in the user-generated content, and/or other information. One or more of the logical relationships may correspond to "cause-and-effect" relationships that may be established between two or more virtual objects, and/or other game entities. A cause-and-effect relationship may specify a virtual object as a causal object, a causal behavior for the causal object, a virtual object as an effected object, an effected behavior of the effected object, and/or other aspects of the cause and effect relationship. In some implementations, the effected behavior and/or causal behavior may comprise actions that are performed on or by the respective object. A logical relationship may then be established by specifying one or more of that detected occurrences of the causal behavior of the causal object may result in the effected object performing the effected behavior, and/or other information. The logical relationship may be determined based on some defined action criteria, and/or other information.

By way of non-limiting example, a given virtual object may be a virtual button. Another given virtual object may be a virtual cannon. The virtual button may be established as the causal object. A causal behavior may comprise the virtual button being "pressed" by a game entity and/or other entity within the virtual space, and/or other behavior. The virtual cannon may be established as the effected object. An effected behavior may comprise the cannon "shooting confetti," and/or other behavior. Action criteria may specify a relationship that may establish "if the virtual button is pressed, then fire confetti out of the virtual cannon", and/or other criteria. Logical relationships may be considered in other ways.

In some implementations, user-generated content may be associated artificial intelligence (AI)-controlled objects, systems, and/or elements. AI-controlled objects may refer to virtual objects within the virtual space which operate by one or more of following predetermined and/or random paths, performing predetermined and/or random actions, and/or other carryout other operations. AI-controlled virtual objects may be virtual objects configured to interact with users in the virtual space. For example, the user-generated content may include AI-controlled virtual characters. AI-controlled virtual characters may travel along paths within a virtual environment represented in the virtual space. Users may be able to interact with the AI-controlled virtual characters within the virtual space according to predetermined and/or random interactions. AI control systems may refer to a collection of AI-controlled objects and/or elements. AI controlled objects, systems, and/or elements may be considered in other ways.

In some implementations, user-generated content may be associated with one or more games which may be created and/or selected by a user. Games may include online games, multi-player games, mini games, bonus games, solo games, campaign games, skills games, games of chance, and/or other games. The games may comprise a game space or area including a simulated environment. The simulated environment may have a topography, express ongoing real-time interaction by one or more users, and/or may include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein.

In some implementations, user-generated content may be associated with game objects, game logic, and/or other content selected and/or entered by a user. Game objects may correspond to the arrangement and/or positioning of virtual objects within the simulated environment that defines the game space. By way of non-limiting example, a game may be a racing game, and game objects may comprise portions of a road which define a race track. The discussion of "racing" above is not intended to limit the type of content which may be provided in the virtual space to define a game space. Instead, this is simply an example and is not limiting with respect to content type, game type, and characteristics associated with a user-generated game. Arrangement of virtual objects within the virtual space may be considered in other ways.

Game logic may correspond to aspects of user interaction in the virtual space. Game logic may correspond to logical relationships which may be established between two or more of the game objects present in the virtual space, as presented herein. Game logic may correspond to one or more game objectives and/or rules associated with a game, and/or other logic associated with user interaction within the virtual space. Rules may describe and/or restrict the manner in which gameplay may commence while interacting with the game to achieve an objective. Game rule rules may describe one or more of a minimum and/or maximum number of players, gameplay duration, levels of a game, bounds of a game space, factors for winning the game, factors for losing the game, and/or other information. Briefly, however, following the above racing game example, game logic such as game rules may include one or more of the designation of where a lap starts and/or ends on a race track, the amount of laps needed to be completed to win a race, the number of players who can race on the track at a given time, and/or other rules associated with gameplay. Game logic may be considered in other ways.

In some implementations, the user-generated content may include metadata associated with the content. The user-generated content component 131 may be configured to receive entry and/or selection of information from the user related to metadata associated with the user-generated content. Metadata may include information such as a name given to the content by the user (e.g., "Bob's Raceway"), a description about the content (e.g., "A ten lap race consisting of 3 hairpin turns!"), an image depicting a view of the content (e.g., a screenshot depicting the starting line of a simulated race track), and/or other information associated with the user-generated content.

In some implementations, the user-generated content component 131 may be configured to configure, compile, and/or store information that defines the user-generated content based on the requests associated with the entry and/or selection of virtual space content. Information that defines user-generated content may include one or more of the platform type of the source computing platform 126, source code which, when executed, provides the user-generated content on a computing platform 126, a representation of the source code, and/or other information that may be used to define the user-generated content of a virtual space. In some implementations, the information that defines user-generated content that was generated on a given source computing platform 126 may be configured in a format that may be specific to the platform type of the source computing platform 126.

In some implementations, the information that defines the user-generated content may be configured at the server 102. That is, the server 102 may be configured to obtain the requests to define user-generated content from the user-generated content component 131. The server 102 may be configured to create, compile, and/or store the information that defines the user-generated content at the server 102 based on the obtained requests. The user may then access and/or participate in the user-generated content through information exchanges between the server 102 and computing platforms 126. For example, information exchange between the server 102 and space component 130 may be facilitated via one or more application program interface (API) calls between the server 102 and/or user-generated content component 131 (and/or other components).

In FIG. 1, the user component 132 may be configured to access and/or manage one or more user profiles, user information, and/or user accounts associated with the users. The one or more user profiles and/or user information may include information stored locally to a given computing platform 126 by server 102, one or more other computing platforms 126, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), control input information (e.g., a history of control inputs provided by the user), user-generated content history information, user-generated content sharing history information, virtual inventory information (e.g., virtual inventories associated with the users that include one or more virtual items available for the users in the virtual space and/or game entities available to the user for use in a group of game entities in the virtual space), relationship information (e.g., information related to relationships between users in the virtual space), virtual space usage information (e.g., a login history indicating the frequency and/or amount of times the user logs in to the user accounts), demographic information associated with users, interaction history among users in the virtual space, information stated by users, browsing history of users, a computing platform identification associated with a user, a phone number associated with a user, and/or other information related to users.

In FIG. 1, the server 102 may include electronic storage 120, one or more processors 104, and/or other components. The one or more processors 104 may be configured to execute one or more computer program components. The computer program components may include one or more of a receiving component 106, a sharing component 108, a conversion attribute component 110, an actual cost component 112, an impact component 114, an estimated cost component 116, a notification component 118, and/or other components. In some implementations, the server 102 may include some or all of the components included in the computing platforms 126.

The receiving component 106 may be configured to receive information that defines the user-generated content and/or other information. The receiving component 106 may receive the information from the computing platforms 126 (e.g., the user-generated content component 131). The receiving component 106 may be configured to receive the information automatically in response to user input for sharing the user-generated content, retrieve the information, and/or otherwise obtain the information in other ways.

In some implementations, the receiving component 106 may obtain the information automatically. The information that defines user-generated content may be communicated from the computing platforms 126 to the server 102 automatically once the user has created and/or saved at least some portion of user-generated content. By way of non-limiting illustration, the user may save their progress during creation of user-generated content periodically (or once finished), such that each time the information that defines the user-generated content is saved and/or updated, the information may be communicated to the receiving component 106.

The receiving component 106 may be configured to receive the information that defines the user-generated content based on user input at the computing platforms 126. The users may provide entry and/or selection at the computing platforms 126 to send the information that defines the user-generated content to the server 102 (e.g., receiving component 106).

The receiving component 106 may receive the information by retrieving the information from the computing platforms 126. In some implementations, the user may be prompted that the receiving component 106 is attempting the retrieve the information. The user may then provide entry and/or selection at the computing platform to accept or reject the retrieval request.

The above discussion of how the receiving component 106 may receive the information that defines the user-generated content is not intended to limit the manner and technique in which this, and other information, may be obtained by the receiving component 106. Instead, this is simply an example and is not limiting with respect to the receiving component 106 receiving the information, retrieving the information, and/or obtaining the information in other ways.

Figure 2:
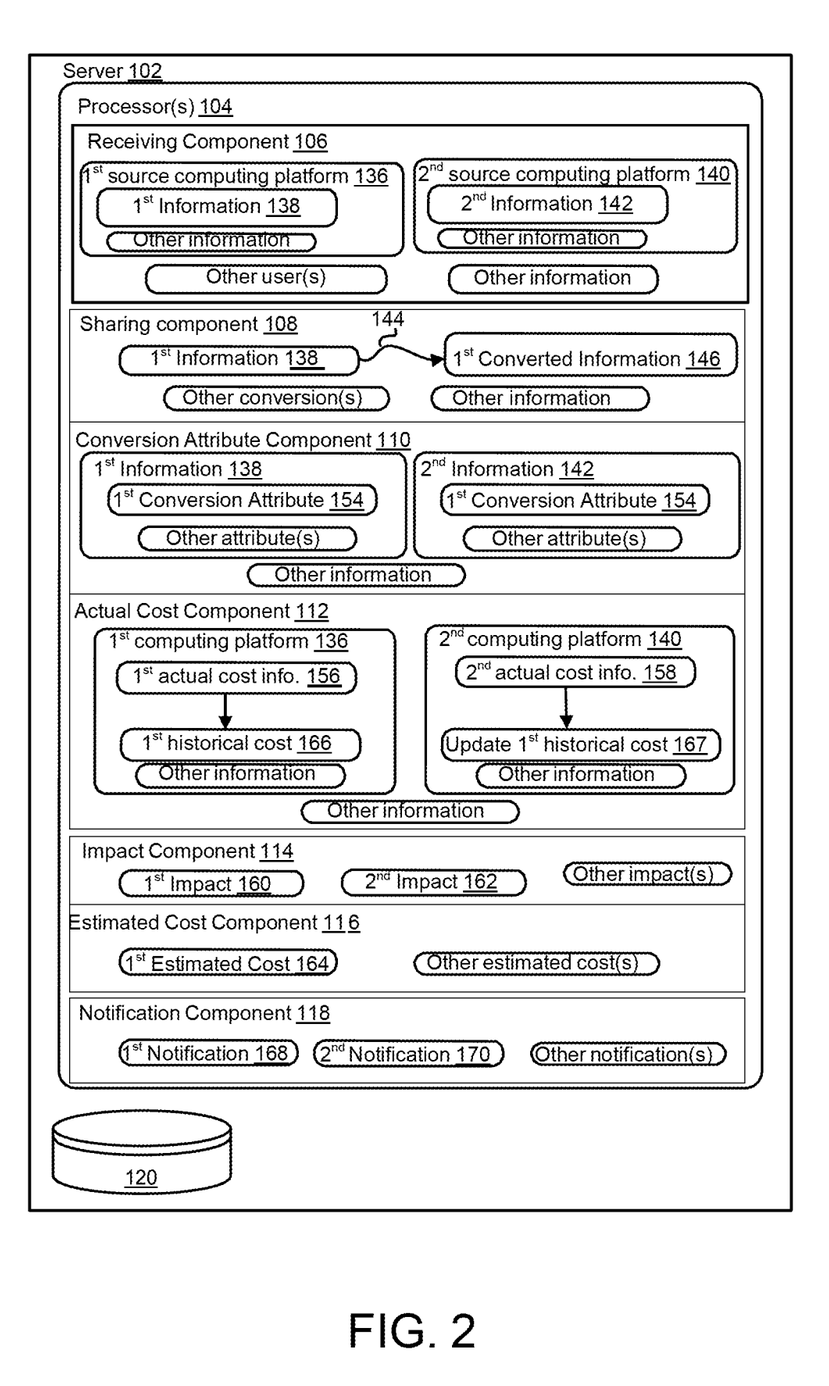
FIG. 2 illustrates an implementation of a server employed in the system of FIG.

As an illustrative example in FIG. 2, the receiving component 106 may be configured to receive first information 138 that defines first user-generated content (not shown in FIG. 2). The first user-generated content may be associated with a first characteristic and/or other characteristics. The first user-generated content may be content created by a first user (not shown in FIG. 2). The first user may have created the content in a first instance of the virtual space executed by a first source computing platform 136. The first source computing platform 136 may be of a first platform type, and/or other platform types.

In some implementations, the receiving component 106 may be configured to receive second information 142 that defines second user-generated content (not shown in FIG. 2). The second user-generated content may be associated with the first characteristic, and/or other characteristics. The second user-generated content may be content created by a second user (not shown in FIG. 2). The second user may have created the second user-generated content in a second instance of the virtual space executed by a second source computing platform 140. The second source computing platform 140 may be of the first platform type.

Referring back to FIG. 1, the sharing component 108 may be configured to facilitate sharing of user-generated content between users (e.g., from source computing platforms to end computing platforms). The sharing component 108 may be configured such that facilitating sharing of user-generated content comprises converting the format of the information that defines the user-generated content received by the receiving component 106 to a sharable format. Converting the format of the information that defines the user-generated content to a format configured for sharing may facilitate the sharing of the user-generated content. For example, the conversion of the information may allow user-generated content that may have been configured on a source computing platform 126 of a particular platform type (and is of a particular format) to be shared and experienced by users of end computing platforms which operate different platform types.

In some implementations, converting the information that defines the user-generated content to the sharable information that defines the user-generated content may include one or more of converting the format of the information to one or more different sharable formats, and/or other operations. For example, the format of the information that defines user-generated content may be a format that is specific to the platform and/or platform type of the source computing platform 126 (herein referred to as "source information"). In some implementations, the sharable format may be a format which is readable by computing platforms 126 of one or more platform types (e.g., a "generic" format). For example, the conversion may include converting the platform-specific format of the information to an open standard data format of the information. This may include, for example, a text-based format like JavaScript Object Notation (JSON) format and/or other formats.

JSON format conversion may be used for serializing the platform-specific format for transmitting the structured data over a network communication (e.g., for communication to and from the server 102). Conversion may be accomplished by one or more suitable data conversion technique. Other considerations for sharable formats which one skilled in the art may deem suitable for the intended purpose are also contemplated. In some implementations, the converted content may be compressed using suitable file compression techniques. By way of non-limiting example, the sharable user-generated content may be a JSON data file which is compressed using GZIP and/or other suitable file compression technique.

In some implementations, the sharing component 108 may be configured such that facilitating the sharing of user-generated content includes performing platform type-specific format conversions of the information that defines the user-generated content. In some implementations, the platform type-specific conversions may include one or more of converting the source information first to a "generic" format (e.g., shareable information), then to a platform type-specific format of the information (e.g., converted information), and/or other operations. It is noted that the term "converted information" may be used herein to describe information that has been converted from one platform type-specific format to a different platform type-specific format.

In some implementations, conversion from a generic format to a platform type-specific format may include one or more of decompressing the compressed sharable format data files, converting the decompressed sharable information format to the platform type-specific format (e.g., converting from JSON to a format readable by an XBOX platform type or other platform type), and/or other operations. The process for converting sharable information that defines the user-generated content to platform-specific information (e.g., converted information) may be the opposite of the procedure used to convert the source information that defines the user-generated content to the sharable, or generic, information, and/or may employ other techniques.

In some implementations, the platform type-specific format conversions may include converting the format of the source information directly to a different platform type-specific format. In some implementations, direct conversion of the source information to the converted information may be accomplished by one or more suitable technique.

In some implementations, the sharing component 108 may be configured such that users may perform one or more operations of uploading information that defines their user-generated content, downloading information that defines other user-generated content (e.g., the sharable information and/or converted information), and/or other operations. The sharing component 108 may be configured to maintain a catalogue of the uploaded user-generated content. The catalogue may be organized into, and/or may include, an index of the metadata associated with the user-generated content, and/or other information. The users may access the server 102 (e.g., the sharing component 108) such that the server 102 may effectuate views of a user interface depicting the catalogue of the metadata associated with the user-generated content which has been made available for access, and/or other perform other operations.

As an illustrative example, in FIG. 2, the sharing component 108 may be configured to convert 144 the first information 138 that defines the first user-generated content to first converted information 146 that defines the first user-generated content. In some implementations, the conversion 144 may be specific to a second platform type, and/or other platform types. The second platform type may be different from the first platform type. That is, the first information 138 may be of a format that is specific to the first platform type, while the first converted information 146 may be of a format that is specific to the second platform type. By way of non-limiting example, the first platform type may be XBOX and/or other platform types. The second platform type may be Wii, and/or other platform types.

The sharing component 108 may be configured to convert other information to converted information. For example, the sharing component may be configured to convert the second information 142 to second converted information (not shown in FIG. 2). The second information 142 may be of a format specific to the first platform type, while the second converted information may be of a format specific to the second platform type.

Returning to FIG. 1, the conversion attribute component 110 may be configured to determine one or more conversion attributes associated with the information that defines the user-generated content. The conversion attributes may represent the various format conversion processes, routines, and/or procedures that may take place in order to convert the source information to converted information, either directly or indirectly. The conversion attributes may be determined based on one or more characteristics of the user-generated content, the platform type of the source computing platform, the platform type of the end computing platform, and/or other information.

In addition or as an alternative to the characteristics of user-generated content presented above, the different characteristics of user-generated content may include one or more of the static content (e.g., a building and/or other content), moving content (e.g., a vehicle and/or other content), interactive content (e.g., a building which a user can enter, a vehicle which a user can control, and/or other content), interrelated content, visual effects (e.g., coloring, shading, contrast, and/or other effects), audio effects, artificial intelligence (AI) entities (e.g., an AI-controlled non-player character and/or other entities), game-related content (e.g., game objects, game logic, and/or other content), virtual items, playable characters, virtual object properties (e.g., strength, power, speed, and/or other properties), and/or other characteristics.

The conversion attributes may be associated with the different characteristics or combinations of characteristics of the user-generated content, and/or other factors. Conversion attributes may be determined by tagging and/or otherwise noting portions of the information that define these different characteristics and/or other factors that may contribute to costs during and/or after conversion. In some implementations, during creation of the user-generated content, the information that defines the user-generated content may be initially tagged and/or portions thereof noted for each characteristic, combination of characteristics, and/or other factors that may contribute to costs during and/or after conversion. By way of non-limiting example, the different characteristics may be distinguishable by identifiers and/or other information included in portions of the source code that defines the user-generated content. In some implementations, the tagging and/or noting of factors may be accomplished after the user-generated content has been defined. By way of non-limiting example, the information may be scanned and tagged to identify the characteristics and/or other factors that contribute to cost during and/or after conversion.

By way of illustration in FIG. 2, the conversion attribute component 110 may be configured to determine conversion attributes of the first information 138 that defines the first user-generated content. The conversion attributes of the first information 138 may include a first conversion attribute 154 and/or other attributes. The first conversion attribute 154 may correspond to the first characteristic of the first user-generated content. Other conversion attributes may correspond to other characteristics of the first user-generated content.

The conversion attribute component 110 may be configured to determine conversion attributes of the second information 142 that defines the second user-generated content. The conversion attributes of the second information 142 may include the first conversion attribute 154 and/or other attributes. The first conversion attribute 154 may correspond to the first characteristic of the second user-generated content. Other conversion attributes may correspond to other characteristics of the second user-generated content.

Returning to FIG. 1, the actual cost component 112 may be configured to obtain actual cost information from the end computing platforms after the converted information is executed thereon. The actual cost information may be associated with actual cost for executing the converted information on the end computing platforms of the different platform types. The end computing platform may run local usage reports to determine actual cost associated with executing the converted information. A usage report may determine actual cost information such as one or more of information about the quality of the user-generated content on the end computing platform, whether the converted information was executed successfully (e.g., caused the end computing platform to crash, freeze, lag, stall, and/or other information), whether specific portions of the converted information have been executed successfully, identification of the portions of the converted information that may not have been executed successfully and/or may have contributed to a degradation in quality, and/or other information.

In some implementations, cost may be a description of the level of quality of the user-generated content implemented on the end computing platforms, and/or other information. The quality may be associated with a rendering quality of the user-generated content. Rendering quality may correspond to one or more of a level of detail achieved (or not achieved) on the end computing platform, a rendering speed (e.g., "lag"), and/or other information. The quality may be associated with limitations on the interactivity of the content. Interactivity may correspond to whether a particular feature such as a game mechanic, logical relationship, and/or other feature and/or function associated with the user-generated content may work and/or otherwise function properly. Quality may be considered in other ways.

In some implementations, factors that may contribute to the cost in executing converted information on end computing platforms may include one or more of the conversion attributes associated with the converted information, the corresponding characteristics of the user-generated content, the platform type of the source computing platform, the platform type of the end computing platform, and/or other factors. For example, cost may be attributed to the fact that source computing platforms of a particular platform type may have processing power and/or functionality that may be different from the end computing platforms of a different platform type. The processing and/or functionality may correspond to one or more of the capabilities of a central processing unit, graphics processing unit (GPU), memory, a network connection(s), peripheral component (e.g., a display, a controller, and/or other components), and/or other component(s) of the computing platforms 126. Since the physical components as well as the capabilities of these components may differ between source and end computing platforms of different platform types, the ability to execute the same or similar information (converted information) may differ as well.

The costs may be associated with individual ones of the conversion attributes of converted information, combinations of conversion attributes, and/or other operations. The cost information may include individual costs that correspond with one or more of conversion attributes, certain combinations of conversion attributes, and/or other operations. This may include one or more of information of how a given conversion attribute affected (or did not affect) the quality of the user-generated content or portions thereof, a successful execution of the converted information in general, and/or other information. The costs that may correspond with the conversion attributes may be correlated as costs of the corresponding characteristics of the user-generated content.

The cost information may include qualitative and/or quantitative descriptions of the associated costs. A qualitative description of cost may include one or more of whether the cost was "high," which may mean the quality and/or execution of the converted information was adversely affected at the end computing platform (e.g., substantially reduced resolution, substantial lag, freezing and/or locking up such that the user-generated content was not playable by the user, crashing, and/or other factors); "moderate," which may mean the quality and/or execution of the converted information was somewhat adversely affected (e.g., some reduction in resolution, some lag, minimal or no freezing and/or locking up such that the user-generated content was accessible but some features were not, minimal to no crashing, and/or other factors); "low," which may mean the quality and/or execution of the converted information was substantially not affected (e.g., some reduction in resolution, minimal to no lag, no freezing and/or locking up, no crashing, and/or other factors); "none," which may mean that the quality and/or execution of the converted information was unaffected and all aspects of the user-generated content were accessible; and/or other information.

It is noted that the discussion of "high," "moderate," "low," and/or "none" above is not intended to limit the way in which cost may be determined and/or described qualitatively. Instead, this is simply an example and is not limiting with respect to other ways in which the cost for executing converted information on end computing platforms may be described.

In some implementations, a qualitative description of cost may include a rank, score, value, and/or other information that expresses the cost for executing the converted information on an end computing platform. By way of non-limiting example, a rank may comprise a whole number from 0 to 10, where 10 represents the "high" threshold of cost, 0 represents the "none" threshold of cost, and values in between represent relative costs within the range from "none" to "high," and/or other information. For example, 5 may represent the "moderate" threshold of cost, and/or other representation.

In some implementations, a quantitative description may be in relation to an amount or percentage of the processing and/or functional capabilities of the end computing platform were used to execute the converted information. A usage report run on an end computing platform may determine that the execution of the converted information on the end computing platform required a certain percentage of the processing and/or functional capabilities. This may include percentage values associated with the use of the CPU, memory, GPU, and/or other components. By way of non-limiting illustration, actual cost information may describe that the converted information required 40% (or other amount) of the processing and/or functional capabilities of the end computing platform. By way of additional non-limiting illustration, actual cost information may describe how individual characteristics of the user-generated content contribute to the cost. This may include, for example, that a first characteristic of the user-generated content contributed to 20% of the processing power of the GPU, 25% of the memory, and/or other characteristics.

It is noted that the discussion of quantitative descriptions of cost above is not intended to limit the way in which cost may be determined and/or described. Instead, this is simply an example and is not limiting with respect to other ways in which the cost for executing converted information on end computing platforms may be described qualitatively and/or quantitatively.

As an illustrative example in FIG. 2, the actual cost component 112 may be configured to obtain first actual cost information 156 associated with executing first converted information 146 on a first end computing platform (not shown in FIG. 2). The first end computing platform may be of the second platform type. The first actual cost information 156 may include an actual cost associated with the first conversion attribute 154. For example, the actual cost associated with the first conversion attribute 154 may correspond to the actual cost associated with executing the first converted information 146 to implement the first characteristic in the virtual space at the first end computing platform, and/or other information.

The actual cost component 112 may be configured to obtain second actual cost information 158 associated with executing second converted information (not shown) on a second end computing platform (not shown in FIG. 2). The second end computing platform may be of the second platform type. The second end computing platform may be associated with a third user (not shown). The second actual cost information 158 may include an actual cost associated with the conversion attributes of the second information 142 that defines the second user-generated content. For example, the actual cost associated with the first conversion attribute 154 of the second information 142 may correspond to the actual cost associated with implementing the first characteristic in the virtual space at the second end computing platform.

Returning to FIG. 1, the impact component 114 may be configured to determine impacts of the conversion attributes on the actual cost for executing the converted information on the end computing platforms. The impacts may be determined based on the obtained actual cost information, the platform type of the source computing platform, the platform type of the end computing platform, and/or other information.

The impacts may include information that correlates, for individual ones of the conversion attributes or combinations of conversion attributes, the obtained actual cost information associated with a given conversion attribute or combination (e.g., and how it affected or did not affect the user-generated content on the end computing platform), the platform type of the source computing platform, the platform type of the end computing platform, and/or other information.

The impacts may correlate this information and index the information within a database. Conversion attributes being indexed in this way may provide insight as to how these conversion attributes, when identified in other information that defines user-generated content, may affect the converting and/or sharing of the information between source and end computing platforms. By way of non-limiting example, the impacts may correlate information that provides insight as to whether the end computing platform was actually able to run the converted information, if one or more issues occurred during conversion and/or implementation of the converted information, and/or other information that may be directly related to the conversion attributes (individually or in combination). By creating and/or otherwise providing a database including an index of this information, patterns and/or recurrences of particular conversion attributes having particular actual costs may be determined. These patterns and/or recurrences may be used to estimate costs associated with other information that defines user-generated content that may include the same or similar particular conversion attributes (e.g., same or similar characteristics in the user-generated content). That is, conversion attributes of the information may be determined, matched with the same or similar conversion attributes within the database, and correlated with the cost information known from the matched conversion attributes to determine estimated costs (e.g., via estimated cost component 116). The known cost information stored in the database may be referred to as "historical costs."

Patterns of costs may be determined based on impacts that correlate a particular source computing platform type and end computing platform type, and/or other information. By way of non-limiting illustration, a particular conversion attribute may be associated with a first historical cost when the source computing platform is of a first platform type and the end computing platform is of a second platform type. However, the same conversion attribute may be associated with a second historical cost when the source computing platform is of a third platform type and the end computing platform is of a fourth platform type. Patterns may be determined that establish one or more of the impact of particular conversion attribute is different (or similar) when the source computing platform is of the first platform type and the end computing platform is of the second platform type compared to when the source computing platform is of the third platform type and the end computing platform is of the fourth platform type, and/or other information. Patterns may be considered in other ways.

Indexing such information via the impacts may provide a technique in which conversion attributes may be uniquely associated with historical costs based on factors such as source and end computing platform types, as well as other factors. However, in other implementations, determining impacts may be considered in other ways.

In some implementations, combinations of conversion attributes may not be associated with cost that is simply the sum of the costs for the individual conversion attributes included in the combination. For example, a first conversion attribute may correspond to a first characteristic and may, individually, be associated with a first actual cost given the platform types of a first source computing platform and a first end computing platform. A second conversion attribute may correspond to a second characteristic and may, individually, be associated with a second actual cost. However, user-generated content including a combination of both the first characteristic and the second characteristic may correspond to a third conversion attribute. The cost of the third conversion attribute may not simply be the sum of the first cost and the second cost. Instead, the third conversation attribute may be associated with a third cost (which may be more or less than the sum of the first and second actual costs). This difference may be due to one or more of that the first characteristic and second characteristic may interact in some way, the way in which the information that defines the user-generated content may be different by virtue of the combination, and/or other factors. For example, an interaction between the first and second characteristics may change how the source computing platform defines, stores and/or manages the information that would otherwise define the two characteristics independently. This change may ultimately result in how an end computer platform handles the converted information during execution.

By way of non-limiting illustration, a cost associated with executing converted information that defines a virtual bakery (a first characteristic and conversion attribute) may be a first cost given the platform types of a first source computing platform and a first end computing platform. A cost associated with executing converted information that defines a non-player character baker (a second characteristic and conversion attribute) may be a second cost. However, a cost associated with executing converted information that defines a non-player character baker that interacts within a virtual bakery may be a third cost. The third cost may be different from simply the sum of the first and second costs. This may be due to, at least in part, the fact that the non-player character baker may interact with the virtual bakery in some meaningful manner, and/or other factors. For example, the information that defines the combination of the first and second characteristic of the user-generated content may be different from information that defines the first and second characteristic independently, and/or may include other information.

As an illustrative example in FIG. 2, the impact component 114 may be configured to determine a first impact 160 and/or other impacts. The first impact 160 may be associated with the impact of the first conversion attribute 154. The first impact 160 may be determined based on the first actual cost information 156, the first platform type, the second platform type, and/or other information. The first impact 160 may include information that correlates the first conversion attribute 154 with the first actual cost information 156, the first platform type, the second platform type, and/or other information. For example, the first impact 160 may be configured to define a first historical cost 166 of the first conversion attribute 154. The first historical cost 166 may be defined as the actual cost associated with the first conversion attribute 154 as determined from the sharing of the first information 138 between the first source computing platform 136 and the first end computing platform. As such, the first historical cost 166 may be specifically associated with a cost of the first conversion attribute 154 when the source computing platform is the first platform type and the end computing platform is the second platform type. The first impact 160 and/or other impacts may be stored in a database (e.g. electronic storage 120, and/or other storage).

In some implementations, the conversion attribute component 110 may be configured to determine a second conversion attribute (not shown) associated with the first information 138. The actual cost component 112 may be configured such that the first actual cost information 156 includes an actual cost associated with the combination of the first conversion attribute 154 and the second conversion attribute. The impact component 114 may be configured to determine a second impact 162 corresponding to the actual cost associated with the combination of the first and second conversion attributes.

Returning to FIG. 1, the estimated cost component 116 may be configured to determine estimated cost information for current implementations of user-generated content created by users. Estimated cost information may be determined based on the receiving component 106 obtaining the information that defines current user-generated content. Estimated cost information may be determined prior to an actual conversion and/or execution of the information that defines the current user-generated content on an end computing platform, and/or at other times. For example, estimated cost information may be determined prior to and/or after a user uploads his or her user-generated content for sharing with other users, and/or other at other times. The determination of estimated cost information may be used to notify users of an expectation of quality and/or other information related to executing platform type-specific conversions of the information on the end computing platforms that are of different platform types than the source computing platform, and/or other information.

In some implementations, estimated cost information may be determined based on the impacts (e.g., stored and/or maintained by the impact component 114), and/or other information. Again, the impacts may associate conversion attributes and/or combinations of conversion attributes with historical costs, source computing platform types, end computing platform types, and/or other information determined from prior sharing of user-generated content. In a first operation of estimating costs for current user-generated content, one or more conversion attributes and/or combinations of conversion attributes associated with the information that defines the user-generated content may be determined (e.g., via conversion attribute component 110). In a next operation, the determined one or more conversion attributes and/or combinations of conversion attributes may be correlated with impacts. The impacts may include corresponding historical costs associated with the conversion attributes and/or combinations thereof, a particular source computing platform type, a particular end computing platform type, and/or other information. In a next operation, the estimated cost component 116 may be configured to determine estimated costs for the current user-generated content based on the historical costs. For example, the estimated costs may be determined to be the historical costs. One or more other operations may be performed.

The actual cost component 112 may then obtain the actual costs associated with sharing the current user-generated content through executions of converted information at different end computing platforms. Variances from the estimated costs and the subsequently obtained actual costs may be determined. The historical costs from which the estimated cost was determined may be updated according to the variances. As a non-limiting example, a prior stored historical cost of a conversion attribute may be updated to be an average of the prior historical cost and a currently obtained actual cost for that conversion attribute and/or combination of attributes. As another non-limiting example, the historical cost may be updated to simply be the most recently obtained actual cost for that conversion attribute and/or combination.

As more user-generated content is shared between users, the historical costs of conversion attributes and/or combinations thereof may be continually updated and/or refined. One may ascertain that, by performing ongoing mining and updating of such information from the sharing of user-generated content, the historical costs may become better estimates of actual cost.

By way of illustration in FIG. 2, the estimated cost component 116 may be configured to determine first estimated cost information 164 and/or other information. The first estimated cost information 164 may be associated with executing the second converted information (not shown) on the second end computing platform and/or other end computing platform. Again, the second converted information may be a second platform type-specific conversion of the second information 142. As such, the first estimated cost information 164 may be determined based on the first platform type, the second platform type, one or more conversion attributes associated with the second information 142 (e.g., the first conversion attribute 154), a combination of conversion attributes, impacts of the conversion attributes and/or combinations thereof, and/or other information. In some implementations, the first estimated cost information 164 may be determined prior to obtaining the second actual cost information 158.

The first estimated cost information 164 may be determined based on the first conversion attribute 154 of the second information 142. The first conversion attribute 154 may be associated with the first impact 160, as determined previously based on sharing the first information 138. That is, the first impact 160 may include the first historical cost 166 associated with the first conversion attribute 154, the first platform type as the source computing platform, the second platform type as the end computing platform, and/or other information. The first estimated cost information 164 may include a first estimated cost for the first conversion attribute 154. The first estimated cost for the first conversion attribute 154 may be the first historical cost 166 of the first conversion attribute 154. The first estimated cost information 164 may be used to determine notifications to present at the source and one or more end computing platforms.

At some time thereafter, the actual cost component 112 may obtain the second actual cost information 158. Again, the second actual cost information 158 may include another actual cost of the first conversion attribute 154 between the second source computing platform 140 of the first platform type and the second end computing platform of the second platform type. However, even though the first source computing platform 136 and the second source computing platform 140 may be of the same platform type, and the first end computing platform and the second end computing platform may be of the same platform type, the actual costs for the first conversion attribute 154 may differ in these different applications. For example, these differences may be due to the other characteristics (and therefore conversion attributes) associated with the second user-generated content, variances in other components of the computing platforms (e.g., different CPU, GPU, RAM, ROM, and/or other differences), and/or other factors. As such, after the actual cost is obtained for the first conversion attribute 154 based on the second information 142, the first historical cost 166 of the first conversation attribute 154 may be updated 167 based on one or more differences and/or variances.

Returning to FIG. 1, the notification component 118 may be configured to determine notifications to present to users based on the determined estimated cost information and/or other information and effectuate presentation of the notifications on one or both of the source computing platforms and end computing platforms. In some implementations, based on the determined estimated cost information, the notification component 118 may be configured to determine a notification that includes a message indicating one or more of whether or not an end computing platform of a particular platform type may be able to execute the converted information (e.g., the likelihood of the end computing platform crashing, lagging, and/or other information); whether one or more particular characteristics, features, and/or functions of the user-generated content may be accessible and/or of sufficient quality; and/or other information.

In some implementations, the notification component 118 may be configured to determine a notification that includes a determined and/or estimated quality of the user-generated content based on the estimated costs. For example, a notification may include information regarding one or more of an estimated or expected level of detail in the content that may be achievable on the end computing platform, a rendering speed, and/or other information. This may include messages indicating that the user-generated content may be pixelated, may include less detail with regard to textures, colors, and/or other aspects, that the end computing platform may freeze, lag, and/or crash, that one or more aspects of the user-generated content may be inaccessible, and/or may indicate other information.

In some implementations, the notification component 118 may be configured to determine a notification that includes determined and/or estimated limitation(s) on the interactivity of the user-generated content. For example, a notification may include a message that indicates one or more of that a particular game mechanic may not work properly, a particular location within the user-generated content may be inaccessible, and/or other information. Notifications may be considered in other ways.

In some implementations, the notification component 118 may be configured to effectuate presentation of the determined notifications on the computing platforms associated with the users. In some implementations, the notifications may be presented on the source computing platforms associated with the content-creating users. In some implementations, the notification may be presented on the end computing platforms associated with users who are retrieving the user-generated content for implementation on their particular computing platforms.

The notification component 118 may be configured to effectuate presentation of a determined notification to a content-creating user during one or more of an upload of the user-generated content to the server 102 (e.g., the sharing component 108), creation of the content, and/or other at other times. For example, a determined notification may include a message indicating that the quality and/or other aspect of the user-generated content may be negatively affected when implemented on one or more particular end computing platforms of a particular type and/or one or more computing platform types in general, and/or other information. In some implementations, the notification may be effectuated in the form of a pop-up window, instant message, and/or by other techniques. As an illustrative example, a notification may include "Your custom world may not be playable on XBOX 360's or Wii's!!!"

In some implementations, the notification component 118 may be configured to effectuate presentation of a determined notification to a content-receiving user during a download of user-generated content from the server 102 (e.g., sharing component 108). For example, a determined notification may include a message indicating that the quality and/or other aspect of the user-generated content may be negatively affected when implemented on the end computing platform associated with the user. In some implementations, the notification may be effectuated in the form of a pop-up window, instant message, and/or by other techniques. As an illustrative example, a notification may include "I'm sorry, but with your device you will be unable to access every location within this shared custom world!!!"

As an illustrative example in FIG. 2, the notification component 118 may be configured to determine a first notification 168 based on the first estimated cost information 164 and/or other information. The first notification 168 may be presented to the second user at the second source computing platform 140 in response to the user uploading the second user-generated content for sharing. The first notification 168 may be presented to the second user at the second source computing platform 140 at other times.

In some implementations, the notification component 118 may be configured to, responsive to an upload request for the second user-generated content by the third user of the second end computing platform, determine a second notification 170 based on the first estimated cost 164. The second notification 170 may be presented on the second end computing platform. Based on the presented second notification 170, the third user may decide whether or not they may wish to continue with uploading the second user-generated content. In some implementations, the second notification 170 may include information related to a recommendation for improving the implementation of the second user-generated content on the second end computing platform. For example, if the first estimated cost 164 indicates that there are considerable memory usage costs, the second notification 170 may include information that recommends freeing up memory space at the end computing platform, and/or other information.

Returning to FIG. 1, server 102, computing platforms 126, and/or external resources 124 may be operatively linked via one or more electronic communication links. For example, such electronic communication links may be established, at least in part, via a network (e.g., network(s) 122) such as the Internet and/or other networks. It will be appreciated that this is not intended to be limiting, and that the scope of this disclosure includes implementations in which server 102, computing platforms 126, and/or external resources 124 may be operatively linked via some other communication media.

The external resources 124 may include sources of information that are outside of system 100, external entities participating with system 100, and/or other resources. In some implementations, some or all of the functionality attributed herein to external resources 124 may be provided by resources included in system 100.

Computing platforms 126 may include electronic storage 134, one or more processors 128, and/or other components. Computing platforms 126 may include communication lines or ports to enable the exchange of information with a network, a server, and/or other computing platforms. Illustration of computing platforms 126 in FIG. 1 is not intended to be limiting. Computing platforms 126 may include a plurality of hardware, software, and/or firmware components operating together to provide the functionality attributed herein to computing platforms 126.

Server 102 may include electronic storage 120, one or more processors 104, and/or other components. Server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage (e.g., 120 and/or 134) may comprise electronic storage media that electronically stores information. The electronic storage media of the electronic storage may include one or both of storage that is provided integrally (i.e., substantially non-removable) with the respective device and/or removable storage that is removably connectable to the respective device. Removable storage may include, for example, a port or a drive. A port may include a USB port, a firewire port, and/or other port. A drive may include a disk drive and/or other drive. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage may include one or more virtual storage resources (e.g., cloud storage, a virtual private network, and/or other virtual storage resources). Electronic storage may store files, software algorithms, information determined by processor(s), and/or other information that enables the respective devices to function as described herein.

Processor(s) (e.g., 104 and/or 120) is configured to provide information-processing capabilities in the respective device. As such, processors may include one or more of a digital processor, an analog processor, a digital circuit designed to process information, an analog circuit designed to process information, a state machine, and/or other mechanisms for electronically processing information. Although the processors 104 and 128 are shown in FIG. 1 as single respective entities within the respective devices, this is for illustrative purposes only. In some implementations, the processors 104 and/or 128 may include one or more processing units. These processing units may be physically located within the same device or may represent processing functionality of a plurality of devices operating in coordination.

For example, processor 104 may be configured to execute components 106, 108, 110, 112, 114, 116, and/or 118. Processor 104 may be configured to execute components 106, 108, 110, 112, 114, 116, and/or 118 by software; hardware; firmware; some combination of software, hardware, and/or firmware; and/or other mechanisms for configuring processing capabilities on processor 104.

It should be appreciated that, although components 106, 108, 110, 112, 114, 116, and/or 118 are illustrated in FIG. 1 as being co-located within a single processing unit, in implementations in which processor 104 includes multiple processing units, one or more of components 106, 108, 110, 112, 114, 116, and/or 118 may be located remotely from the other components. The description of the functionality provided by the different components 106, 108, 110, 112, 114, 116, and/or 118 described above is for illustrative purposes and is not intended to be limiting, as any of components 106, 108, 110, 112, 114, 116, and/or 118 may provide more or less functionality than is described. For example, one or more of components 106, 108, 110, 112, 114, 116, and/or 118 may be eliminated, and some or all of its functionality may be provided by other ones of components 106, 108, 110, 112, 114, 116, 118 and/or other components. As another example, processor 104 may be configured to execute one or more additional components that may perform some or all of the functionality attributed to one or more of components 106, 108, 110, 112, 114, 116, and/or 118.

Figure 3:
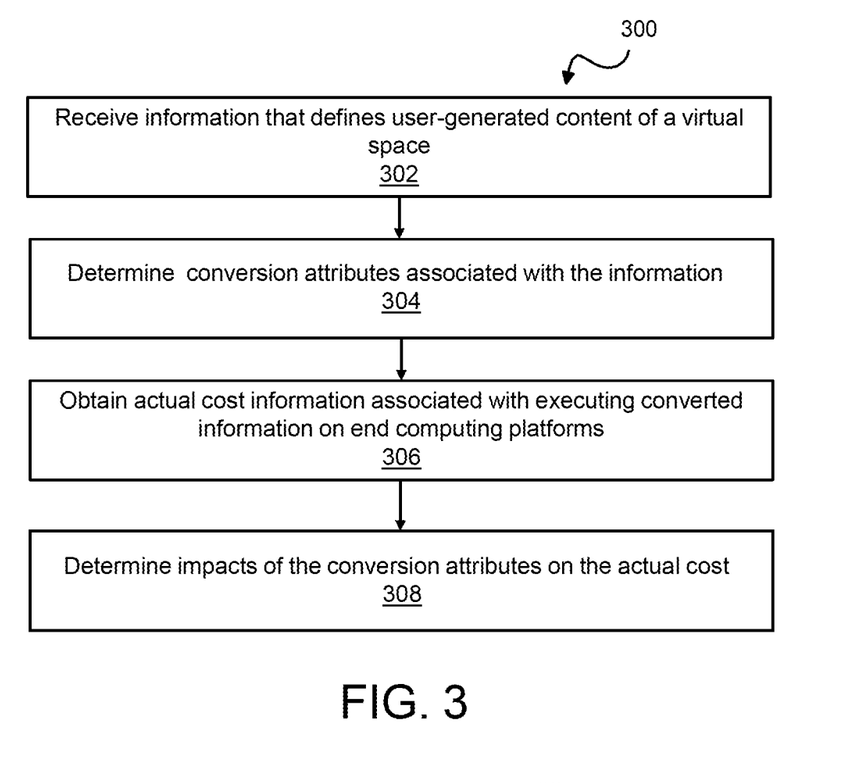
FIG. 3 illustrates an implementation of a method of facilitating the sharing of user-generated content of a virtual space.

FIG. 3 illustrates an implementation of a method 300 of facilitating the sharing of user-generated content of a virtual space. The operations of method 300 presented below are intended to be illustrative. In some implementations, method 300 may be accomplished with one or more additional operations not described and/or without one or more of the operations discussed. Additionally, the order in which the operations of method 300 are illustrated in FIG. 3 and described below is not intended to be limiting.

In some implementations, method 300 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Referring now to method 300 in FIG. 3, at an operation 302, information that defines user-generated content of a virtual space may be received. In some implementations, operation 302 may be performed by a receiving component the same as or similar to receiving component 106 (shown in FIG. 1 and described herein).

At an operation 304, conversion attributes and/or combinations of conversions associated with the received information may be determined. In some implementations, operation 304 may be performed by a conversion attribute component the same as or similar to conversion attribute component 110 (shown in FIG. 1 and described herein).

At an operation 306, actual cost for executing the information that has been converted to a different format may be obtained. The actual cost may be obtained from an end computing platform that executed the converted information. In some implementations, operation 306 may be performed by an actual cost component the same as or similar to actual cost component 112 (shown in FIG. 1 and described herein).

At an operation 308, impacts of the conversion attributes may be determined. In some implementations, operation 308 may be performed by an impact component the same as or similar to impact component 114 (shown in FIG. 1 and described herein).

Figure 4:
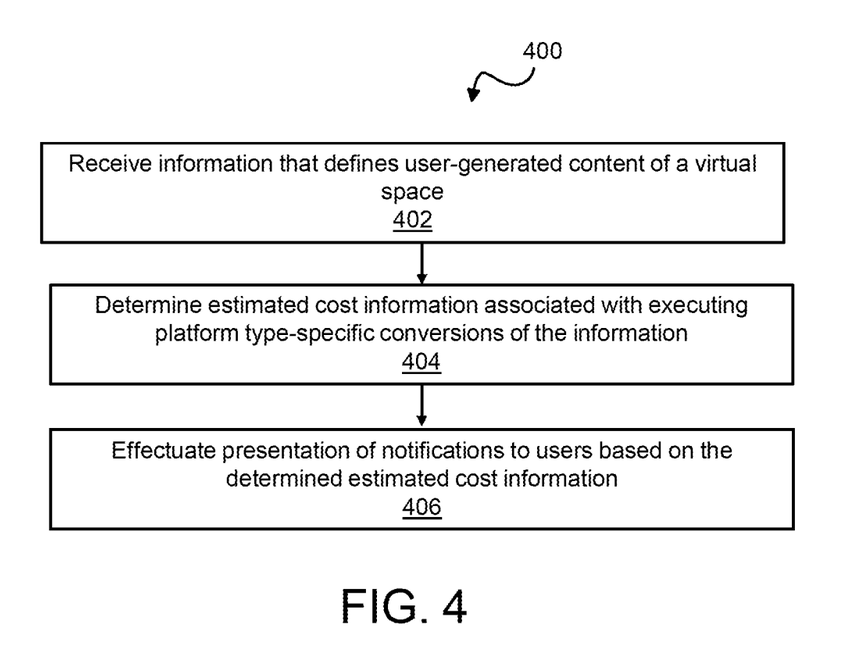
FIG. 4 illustrates an implementation of a method of facilitating the sharing of user-generated content of a virtual space.

FIG. 4 illustrates an implementation of a method 400 of facilitating the sharing of user-generated content of a virtual space. The operations of method 400 presented below are intended to be illustrative. In some implementations, method 400 may be accomplished with one or more additional operations not described and/or without one or more of the operations discussed. Additionally, the order in which the operations of method 400 are illustrated in FIG. 4 and described below is not intended to be limiting.

In some implementations, method 400 may be implemented in one or more processing devices (e.g., a computing platform, a digital processor, an analog processor, a digital circuit designed to process information, an analog circuit designed to process information, a state machine, and/or other mechanisms for electronically processing information) and/or one or more other components. The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

Referring now to method 400 in FIG. 4, at an operation 402, information that defines user-generated content of a virtual space may be received. In some implementations, operation 402 may be performed by a receiving component the same as or similar to receiving component 106 (shown in FIG. 1 and described herein).

At an operation 404, estimated costs associated with executing platform type-specific conversions of the information may be determined. In some implementations, operation 404 may be performed by an estimated cost component the same as or similar to estimated cost component 116 (shown in FIG. 1 and described herein).

At an operation 406, notifications based on the estimated costs may be determined. Presentation of the notifications may be effectuated. Notifications may be presented at one or both of the source computing platform and end computing platforms. In some implementations, operation 406 may be performed by a notification component the same as or similar to notification component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating the sharing of user-generated content of a virtual space, the system comprising:
one or more physical processors configured by computer-readable instructions to:
receive information that defines user-generated content of a virtual space, wherein instances of the virtual space are executed by computing platforms of different platform types that are associated with users of the virtual space, wherein user-generated content corresponds to entry and/or selection of virtual space content by the users via source computing platforms, the entry and/or selection of virtual space content corresponding to requests to define the user-generated content, and wherein the user-generated content is shareable between the source computing platforms and end computing platforms that are of the different platform types, the sharing being facilitated through platform type-specific conversions of the information that defines the user-generated content, the received information including first information that defines first user-generated content, the first user-generated content corresponding to entry and/or selection by a first user via a first source computing platform of virtual space content corresponding to the requests to define the first user-generated content, wherein the first source computing platform is of a first platform type;
determine estimated cost information associated with executing platform type-specific conversions of the information defining the user-generated content on the end computing platforms that are of different platform types than the source computing platforms, the estimated cost information providing a description of a level of quality of the user-generated content when executed on the end computing platforms, the estimated cost information being determined prior to the conversions of the information defining the user-generated content;
receive requests to share the user-generated content;
determine notifications to be sent to the computing platforms of the users in response to receiving the requests to share the user-generated content, the notifications including information relating to the estimated cost information, such that after determining first estimated cost information associated with executing a second platform type-specific conversion of the first information on a first end computing platform of the second platform type, a first notification is determined to be sent to the first source computing platform and/or a second notification is determined to be sent to the first end computing platform.

2. The system of claim 1, wherein the one or more physical processors are configured by computer-readable instructions such that the first estimated cost information is associated with a first conversion attribute of the first information.

3. The system of claim 2, wherein the one or more physical processors are configured by computer-readable instructions such that the first estimated cost information is determined based on a first impact of the first conversion attribute.

4. The system of claim 3, wherein the one or more physical processors are configured by computer-readable instructions such that the first impact is associated with a historical cost, wherein the historical cost is associated with at least one past execution of a second platform-type conversion of information that included the first conversion attribute on an end computing platform of the second platform type.

5. The system of claim 4, wherein the one or more physical processors are configured by computer-readable instructions such that first estimated cost information includes the historical cost.

6. The system of claim 5, wherein the one or more physical processors are configured by computer-readable instructions to obtain first actual cost information associated with executing the second platform-type specific conversion of the first information on the first end computing platform, the first actual cost information including an actual cost associated with the first conversion attribute, and update the historical cost based on the actual cost associated with the first conversion attribute.

7. The system of claim 1, wherein the one or more physical processors are configured by computer-readable instructions such that the first notification includes information associated with an expected quality of the first user-generated content on the first end computing platform.

8. A method of facilitating the sharing of user-generated content of a virtual space, the method being implemented in a computer system including one or more physical processors and storage media storing machine-readable instructions, the method comprising:
receiving information that defines user-generated content of a virtual space, wherein instances of the virtual space are executed by computing platforms of different platform types that are associated with users of the virtual space, wherein user-generated content corresponds to entry and/or selection of virtual space content by the users via source computing platforms, the entry and/or selection of virtual space content corresponding to requests to define the user-generated content, and wherein the user-generated content is shareable between the source computing platforms and end computing platforms that are of the different platform types, the sharing being facilitated through platform type-specific conversions of the information that defines the user-generated content, the received information including first information that defines first user-generated content, the first user-generated content corresponding to entry and/or selection by a first user via a first source computing platform of virtual space content corresponding to the requests to define the first user-generated content, wherein the first source computing platform is of a first platform type;
determining estimated cost information associated with executing platform type-specific conversions of the information defining the user-generated content on the end computing platforms that are of different platform types than the source computing platforms, the estimated cost information providing a description of a level of quality of the user-generated content when executed on the end computing platforms, the estimated cost information being determined prior to the conversions of the information defining the user-generated content;
receiving requests to share the user-generated content;
determining notifications to be sent to the computing platforms of the users in response to receiving the requests to share the user-generated content, the notifications including information relating to the estimated cost information, including after determining first estimated cost information associated with executing a second platform type-specific conversion of the first information on a first end computing platform of the second platform type, determining a first notification to be sent to the first source computing platform and/or determining a second notification to be sent to the first end computing platform.

9. The method of claim 8, wherein the first estimated cost information is associated with a first conversion attribute of the first information.

10. The method of claim 9, wherein the first estimated cost information is determined based on a first impact of the first conversion attribute.

11. The method of claim 10, wherein the first impact is associated with a historical cost, wherein the historical cost is associated with at least one past execution of a second platform-type conversion of information that included the first conversion attribute on an end computing platform of the second platform type.

12. The method of claim 11, wherein the first estimated cost information includes the historical cost.

13. The method of claim 12, additionally comprising:
obtaining first actual cost information associated with executing the second platform type-specific conversion of the first information on the first end computing platform, the first actual cost information including an actual cost associated with the first conversion attribute, and updating the historical cost based on the actual cost associated with the first conversion attribute.

14. The method of claim 8, wherein the first notification includes information associated with an expected quality of the first user-generated content on the first end computing platform.

15. The system of claim 1, wherein the level of quality includes limitations on interactivity of the user-generated content.

16. The system of claim 1, wherein the level of quality includes a level of detail achieved and/or a rendering speed.

17. The method of claim 8, wherein the level of quality includes limitations on interactivity of the user-generated content.

18. The method of claim 8, wherein the level of quality includes a level of detail achieved and/or a rendering speed.

* * * * *